United States Patent
Bakshi et al.

(10) Patent No.: US 6,836,785 B1
(45) Date of Patent: Dec. 28, 2004

(54) METHOD AND APPARATUS FOR THROTTLING REQUESTS TO A SERVER HAVING A BUFFER WITH VARIED ACCEPTANCE LIMIT BASED ON SERVER OVERLOAD STATUS AND DESIRED BUFFER DELAY TIME

(75) Inventors: Yury Bakshi, Morganville, NJ (US); Carolyn R. Johnson, Middletown Township, Monmouth County, NJ (US)

(73) Assignee: AT&T Corp., New York, NY (US)

( * ) Notice: Subject to any disclaimer, the term of this patent is extended or adjusted under 35 U.S.C. 154(b) by 743 days.

(21) Appl. No.: 09/717,151

(22) Filed: Nov. 22, 2000

(51) Int. Cl.[7] .............................................. G06F 15/16
(52) U.S. Cl. .................... 709/203; 709/219; 709/223; 709/224; 709/228; 709/229; 709/235; 710/52; 710/53; 710/54
(58) Field of Search .................. 709/200–310; 710/52, 53, 54

(56) References Cited

U.S. PATENT DOCUMENTS

| | | | | |
|---|---|---|---|---|
| 5,799,002 A | * | 8/1998 | Krishnan | 370/234 |
| 6,154,769 A | * | 11/2000 | Cherkasova et al. | 709/207 |
| 6,510,214 B1 | * | 1/2003 | McDaniel | 379/134 |

* cited by examiner

Primary Examiner—Nabil El-Hady

(57) ABSTRACT

The present invention provides a throttling system that can throttle incoming requests to a server that includes a variable sized buffer for holding incoming calls prior to processing by the server. The number of requests that are held in a queue by the buffer can be dependent on the overload status of the server. If the server is not overloaded, the number of requests that are held in the buffer can be large, such as the full capacity of the buffer. Alternatively, if the server is overloaded for a predetermined amount of time, then the number of requests that are held in the buffer can be decreased, such as to only a portion of the full capacity of the buffer. Any requests that arrive at the buffer once the buffer is at its capacity can be discarded or blocked. Accordingly, a reduction of the buffer size in a overloaded state results in a superior delay performance without increased request blocking of the processor.

16 Claims, 4 Drawing Sheets

METHOD AND APPARATUS FOR THROTTLING REQUESTS TO A SERVER HAVING A BUFFER WITH VARIED ACCEPTANCE LIMIT BASED ON SERVER OVERLOAD STATUS AND DESIRED BUFFER DELAY TIME

BACKGROUND OF THE INVENTION

1. Field of Invention

The present invention is directed to a method and apparatus for throttling requests to a server.

2. Description of Related Art

Currently, it is well known to use a server including a queuing system in order to receive and process requests from a communication system. When a rate of incoming data exceed a server's capacity to process the data, the server is said to be in an overloaded state. Once the server is in an overloaded state, any subsequently received calls are placed into a queue or a buffer. Eventually, as the buffer fills beyond capacity, it can become necessary for the queuing system to block incoming data altogether.

The buffers can be connected with the server and can be used to temporarily store the data until it is to be processed. The data can subsequently be processed in a first in/first out fashion. It is well known to hold data in a buffer in this manner, and buffers can range in length depending on a buffering system's design. The time it takes for data to wait in the buffer before that data is processed by the server is commonly referred to as the delay time. Depending on the length of the buffer and the rate at which the data arrives and is then processed the delay time may vary from a few nanoseconds to many minutes.

Furthermore, typical communication systems are provided with large system buffers so that the system is not required to block any of the incoming requests during statistical load variations. Unfortunately, when under an overload condition for a long duration of time, the large system buffers can remain full for a prolonged period of time. Accordingly, despite the large buffer, it is still necessary for the system to block a portion of the incoming calls. Furthermore, the data that does get placed in the queue can experience lengthy queuing delays since the data must wait for all the data ahead to be processed.

SUMMARY OF THE INVENTION

The present invention provides a method and apparatus for throttling incoming requests to a server including a variable sized buffer for holding incoming requests prior to processing by the server. The number of requests that are held in a queue by the buffer can be dependent on the overload status of the server. If the server is not overloaded, the number of requests that are held in the buffer can be large, such as the full capacity of the buffer. Alternatively, if the server is overloaded for a predetermined amount of time, then the number of requests that are held in the buffer an be decreased, such as to only ¼ of the full capacity of the buffer. Any requests that arrive at the buffer once the buffer is at its current maximum capacity can be discarded or blocked.

By reducing the number of requests that are held in the buffer when the server is overloaded, the delay time for any request that enters the buffer is reduced. This is because the number of requests ahead of the incoming call in the buffer are reduced. Further, the server continues to operate at full capacity since the number of arriving calls is greater than or equal to the processing rate of the server. Accordingly, in this state, the server continues to run at full capacity, while the delay time for any incoming call is shortened.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
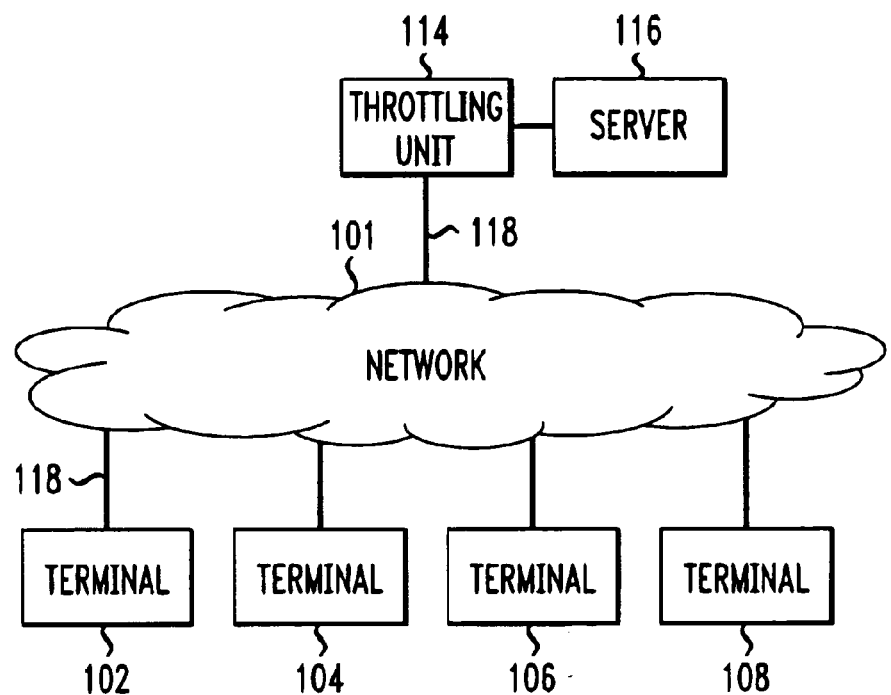
FIG. 1 is an exemplary block diagram of a throttling system in accordance with the present invention.

FIG. 1 is an exemplary block diagram of a throttling system 100 according to the present invention. The system 100 includes a network 101 having a plurality of terminals 102–108 in communication with the network 101 via communication links 118. The system 100 further includes a throttling unit 114 connected with the network 101 via a communication link 118. A server 116 is connected with the throttling unit 114 for communication with the network 101. The throttling unit 114 can monitor and control data transmissions between the terminals 102–108 and the servers 114.

The network 101 may be a single network or a plurality of networks of the same or different types. For example, the network 101 may include a local telephone network, in connection with a long distance network (such as an AT&T long distance network). Furthermore, the network 101 may be a data network or a telecommunication network in connection with the data network. Any combination of telecommunication and data networks may be used with departing from the spirit and scope of the present invention. For the purposes of discussion, it will be assumed that the network 101 is a single data network.

Terminals 102–108, and throttling unit 114 are in communication with network 101 over communication links 118. These communication links 118 can be any type of connection, wired or wireless, that allows for transmission of information. Some examples include, but are not limited to, multiple twisted pair cable, digital subscriber lines (DSL), coaxial cable, optical fiber, RF cable modems, radio, over-the-air optical wavelength (e.g., infrared), local area networks, wide area networks, intranets, virtual private networks, cable TV, terrestrial broadcast radio or television, satellite transmission, simple direct serial/parallel wired connections, or the like.

Terminals 102–108 can be devices of any type that allow for the transmission and/or reception of communication signals. For example, terminals 102–108 can include CPEs, CPE modems, Digital Subscriber Line (DSL) equipment, DSL systems, cable modems, set top boxes, telephones, wireless telephones, cellular telephones, Personal Digital Assistants (PDAs), computer terminals, database terminals, pagers, facsimile machines, answering machines and the like. For the purposes of this disclosure, the terminals 102–108 will be assumed to be computers.

In operation, the throttling unit 114 can control the number of incoming requests that are transmitted to the server 116. To accomplish this, the throttling unit 114 can monitor the server 116 and the incoming requests to determine whether the rate of incoming requests exceeds a processing rate of the server 116. If the rate of incoming requests is less than the processing rate of the server 116, then the server 116 is not overloaded. While the server 116 is not overloaded, the incoming requests can be held in a storage device, such as a buffer, until the server 116 is available to process the incoming request.

If the rate of incoming requests is greater than a processing rate of the server 116 for a prolonged period of time, then the server 116 is in an overloaded state. It is to be understood that any well known method may be used to determine if the server 116 is overloaded. While the server 116 is overloaded, the incoming requests can be held in the storage device in lower amounts. For example, if in the non-overloaded state, a maximum of one hundred requests can be held in a storage device, then only twenty-five requests could be held in the storage device while the server 116 is overloaded. Further, requests that are received after the storage device is at twenty-five would then be discarded or blocked.

Incoming requests can include any item that is queued while waiting for services of the server. For example, callers calling a customer service center can be incoming requests. In this instance, the incoming calls entering the queue may wait until an operator(s) of the customer service center become available to answer the call. Furthermore, the incoming requests can include data packets that are being transmitted to the server for processing. In short, the term incoming requests includes any item that can be stored in the queue for processing by the server.

While the throttling unit 114 is shown as an independent unit coupled to the network 101, it can also be incorporated into the terminals 102–108, server 116 and/or may be distributed throughout the network 101. For example, the throttling unit 114 may be made part of the various central offices or servers (not shown) employed by the network 101 which are distributed throughout the network 01. Any configuration that permits monitoring and control of communications received from the network 101 can be used without departing from the spirit and scope of the present invention.

Figure 2:
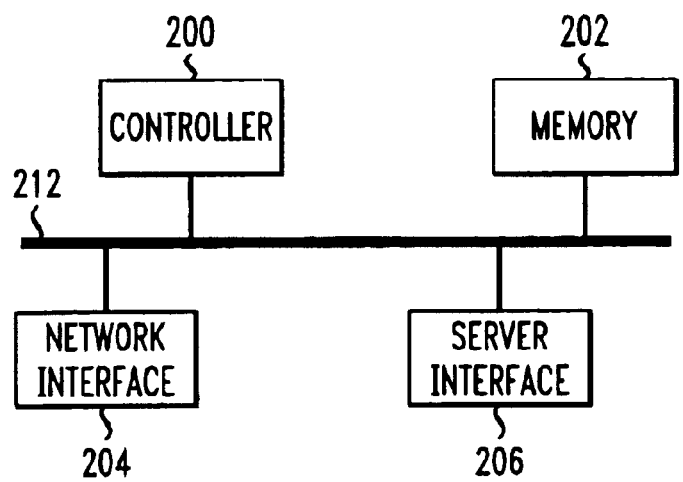
FIG. 2 is an exemplary block diagram of the throttling unit of FIG. 1.

FIG. 2 is an exemplary block diagram of the throttling unit 114. The throttling unit 114 may include a controller 200, a memory 202, a network interface 204 and a server interface 206. The above components are coupled together through a control/signal bus 212. The controller 200 controls the operation of the throttling unit 114 and communicates with the network 101 through the network interface 204.

In operation, the controller 200 receives requests from the network 101 via the network interface 204. The controller 200 can also monitor the overload status of the server 116 via the server interface 206. If the controller 200 receives an incoming request from the network and the server cannot immediately process the request, then the controller 200 temporarily stores the incoming request in the memory 202. The memory 202 can be a buffer or queuing device that stores incoming requests for the server 116 in a first in first out (FIFO) manner. If the controller 200 senses that the server 116 is overloaded, then the controller 200 can reduce the number of incoming requests that are stored in the memory 202.

Figure 3:
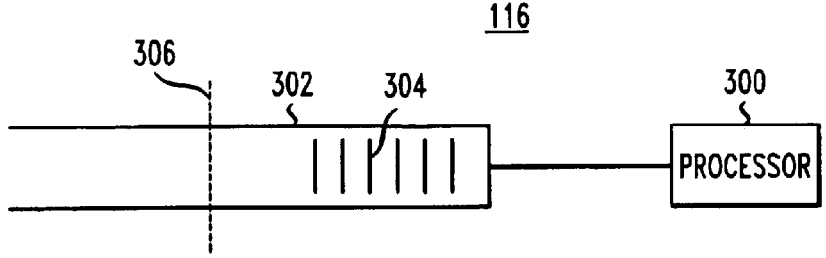
FIG. 3 is an exemplary block diagram of the server of FIG. 1.

FIG. 3 shows a more detailed exemplary block diagram of a variable size buffer 302 and processor 300 of the present invention. The variable size buffer 302 can be any device that is capable of storing incoming requests 304. As described above, the incoming requests 304 are preferably stored in a first in first out (FIFO) manner such that any subsequent request must wait until all prior requests are processed before being processed. The time that it takes for a request 304 to wait in the variable sized buffer 302 to be processed is called the delay time.

The variable size buffer 302 is referred to as variable size because the buffer 302 is capable of varying an acceptance limit 306. The acceptance limit determines the amount of incoming request the variable size buffer can store. The acceptance limit 306 should have at least one setting, one for overload and one for normal operation. In other words, the acceptance limit 306 can be varied between 100% and 0% in order to alter the capacity of the variable size buffer 302. For example, if the maximum capacity of the variable size buffer 302 is 100 incoming request 304, then while the acceptance limit 306 is 100%, the variable size buffer 302 will store up to 100 incoming requests 304. In contrast, when the acceptance limit 306 is 25%, the variable sized buffer 302 will store up to 25 incoming requests 304. In either instance, when a request arrives at a variable size buffer 302 that is currently storing incoming requests at its acceptance limit 306, the incoming request is not stored in the variable sized buffer 302 and the request is blocked or discarded.

The acceptance limit 306 is set in response to an overloaded status of the processor 300. As described above, if the processor 300 is not overloaded, then the acceptance limit 306 is set to be relatively large, such a 100%. Therefore, all incoming requests are stored in the buffer 302 until the buffer 302 reaches full capacity. Once at full capacity, any subsequent incoming requests can be blocked.

If the processor 300 is overloaded, then the acceptance limit 306 can be set to a relatively lower percentage of the full capacity of the variable size buffer 302, such as 25%. Because any requests that are received once the variable size buffer 302 reaches the acceptance limit 306 are then blocked, the delay time of requests waiting in the queue is reduced. In other words, instead of waiting for a delay time corresponding to 100% of the variable buffer 302 size, the request will only have a shorter delay time corresponding to only 25% of the variable buffer size 302.

As described above, the overload status of the processor 300 can be determined based on an arrival rate of the requests and a processing rate of the processor 300 or by any other well known methods. As further described above, the overload status of the processor 300 can be determined by the controller 200. For example, if the processing rate of incoming requests is 10 requests/minute and the incoming call rate is 5 requests/minute, then the processor is not overloaded because the processor 300 is able to handle all incoming requests. Alternatively, if the processing rate remains at 10 requests/minute, then the incoming request rate increases to 15 requests/minute, then after a predetermined period of time, the processor 300 can be determined to be overloaded.

The predetermined period of time can be as small as no time at all, or as large as necessary. The predetermined time can be set based on design requirements for the system, such as processing speed of the processor 300, the buffer size of the variable size buffer 306, and a desired delay time for requests waiting in a queue. The predetermined time limit is mainly to avoid the detection of a false overloaded state of the processor when the incoming call rate is merely temporarily experiencing a spike in the incoming request traffic volume, as opposed to a longer and sustained increase in incoming request traffic.

Figure 4:
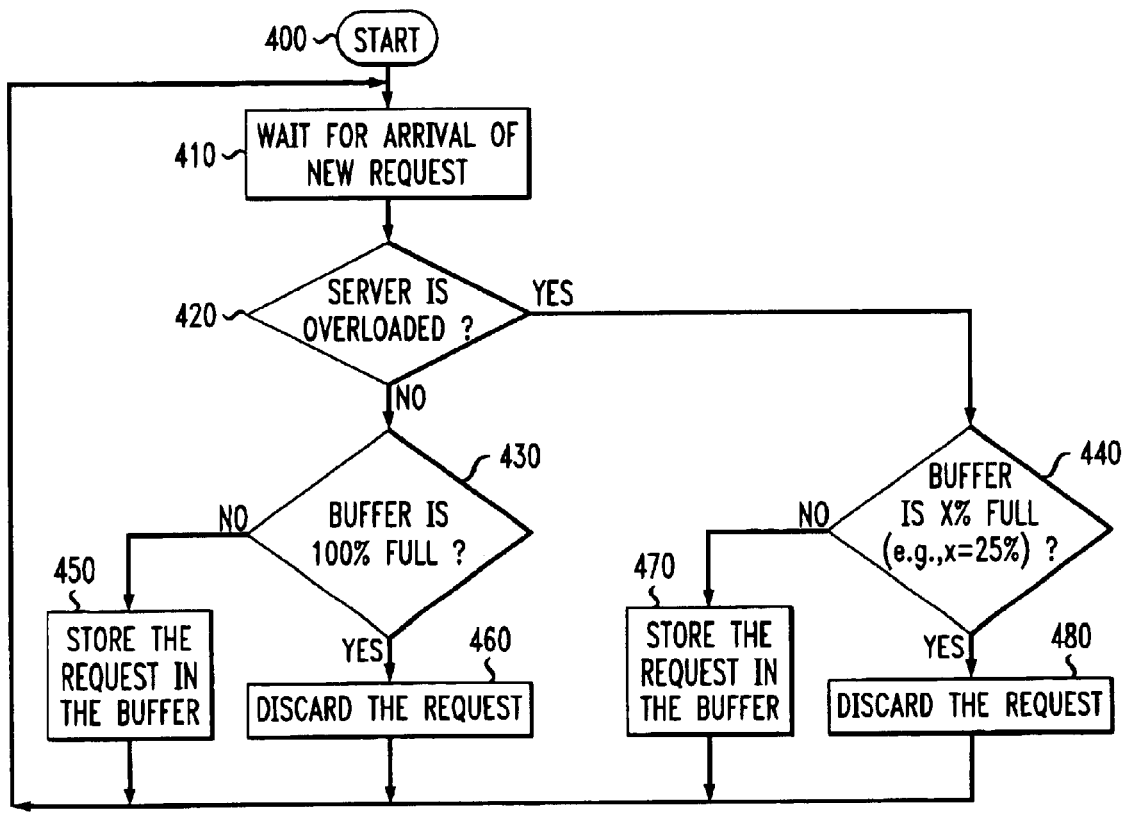
FIG. 4 is a flowchart outlining an exemplary process of the present invention.

FIG. 4 is a flowchart outlining an exemplary process of the throttling system in accordance with the present invention. The process begins in step 400 and proceeds to step 410. In step 410, the server 116 can wait for an incoming request, and once received, the process continues to step 420. In step 420 the process determines whether a server is in an overloaded state. If the server is overloaded, the process proceeds to step 440; otherwise if the server is not overloaded, the process proceeds to step 430.

In step 430, the process determines whether a buffer is 100% full. If the buffer is 100% full, the process proceeds to step 460; otherwise, the process proceeds to step 450 if the buffer is not 100% full. In step 450, the incoming request is stored in the buffer and the process returns to step 410. In step 460, the incoming request is discarded and the process then returns to step 410.

If the server is overloaded in step 420, then at step 440 the process determines whether the buffer is at an acceptance limit. As described above, the acceptance limit can be 25% of the capacity of the buffer. If the buffer is filled to the acceptance limit, then the process proceeds to step 480; otherwise, the process proceeds to step 470. In step 470, the incoming request is stored in the buffer and the process returns to step 410. Alternatively, if the buffer is at an acceptance limit, the incoming request is discarded in step 480 and the process returns to step 410.

Figure 5:
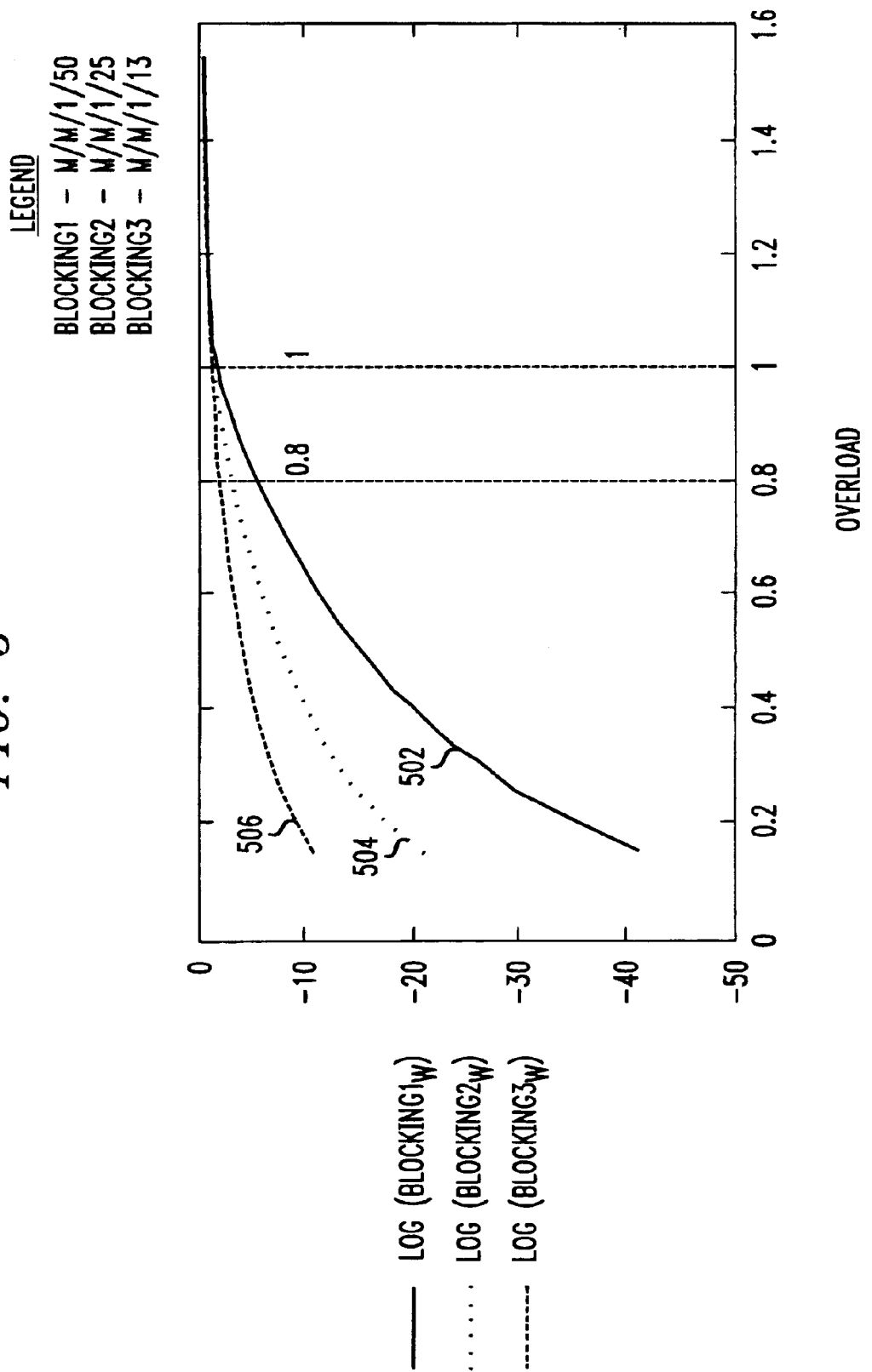
FIG. 5 is a graph illustrating a relationship between request blocking and buffer size.

FIG. 5 shows a graph that plots an amount of blocked requests corresponding to different levels of offered load of the queue 302 of a server 116. Furthermore, the graph includes three separate plots of a M/M/l server having a buffer size of 50 requests (line 502), an acceptance limit of 23 requests (line 504), and an acceptance limit of 13 requests (line 506).

As can be seen from the three plots 502–506 as the offered load approaches 100%, i.e., the overload region, the amount of blocking for each of the buffers is approximately the same. In other words, an overloaded buffer will block the same amount of incoming calls regardless of the size of the buffer. Therefore, the number of served requests is about the same and the server runs at full capacity in all described cases.

Figure 6:
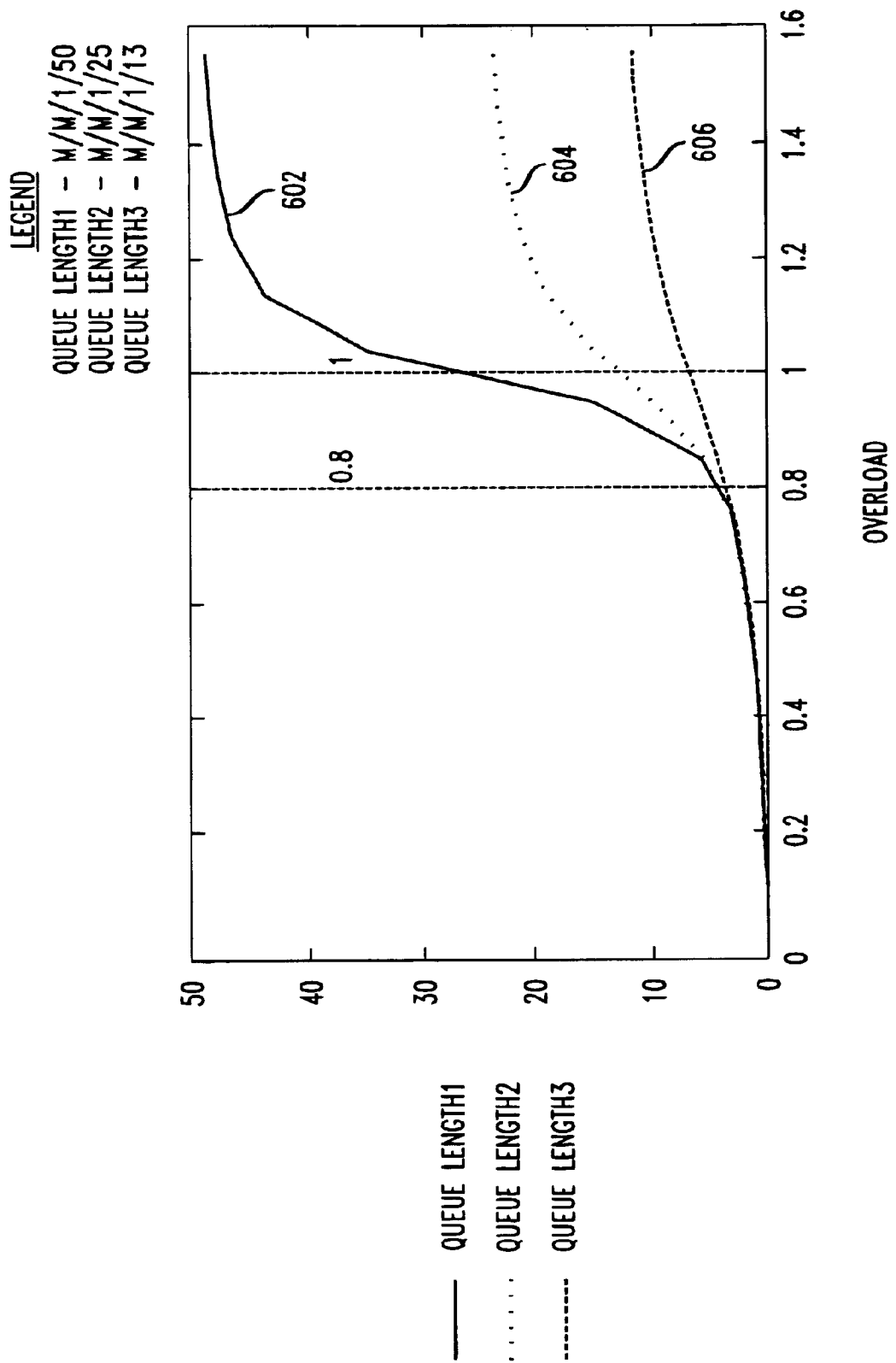
FIG. 6 is a graph illustrating another relationship between number of requests waiting in a queue and buffer size.

FIG. 6 is a graph illustrating the plot of the average queue length of an incoming call versus the offer load. The graph includes three separate plots of a M/M/l server having a buffer size of 50 requests (line 602), a buffer size of 23 requests (line 604) and a buffer size of 13 requests (line 606). The average queue length is directly related to the average delay time before an incoming call can be answered by the process 300.

The graph illustrates that the average queue length, and thus, the average delay time, is significantly larger for the larger buffer size when the offer load is higher than 1.0 (100%). In other words, more requests are arriving than can be served by the processor. This illustrates that a reduction of the buffer size in an overloaded state results in superior delay performance without increasing request blocking of the processor.

By implementing the flowchart of FIG. 4, an algorithm may be obtained to reduce delay during periods of overload. Accordingly, when an arriving load gets and stays over server capacity, for example, offered load is greater than one, the system will block an arrived request if 13 requests or more are waiting in the queue. When an arriving load drops and stays below server capacity (offered load is less than one), the system will block an arrived request if 50 requests are waiting in the queue. This implementation significantly reduces server delay when offer load is greater than 1.0 and only marginally increases blocking.

Thus by blocking requests under overload, delay may be reduced in a communication system operating under sustained overload, i.e. when the arriving load is larger than the system processing capability for a prolonged period of time. Delay may be significantly reduced, for example, when a communication system is provisioned with a large buffer in order to provide adequately low blocking at engineered loads.

The method of this invention is preferably implemented on a programmed processor. However, throttling unit 114 may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method for throttling incoming requests to a server having a variable size buffer for storing incoming calls request to being processed by the server, the method comprising:

receiving incoming requests;

determining whether the server is overloaded;

if the server is overloaded then storing the incoming requests in the buffer only if a number of incoming requests currently stored in the buffer is less than an acceptance limit; and if the server is not overloaded, then storing the incoming request in the buffer;

wherein the acceptance limit is less than 100% of a capacity of the buffer while the server is overloaded, and wherein the acceptance limit is varied in response to the overload status of the server and a desired delay time of processing incoming requests stored in the buffer.

2. The method according to claim 1, wherein determining whether the server is overloaded is based on at least an incoming request rate and a processing rate of the server.

3. The method according to claim 2, wherein the server is overloaded if the incoming request rate exceeds the processing rate of the server.

4. The method according to claim 3, wherein the server is overloaded if the incoming request rate exceeds the processing rate of the server for a predetermined amount of time.

5. The method according to claim 4, wherein the predetermined amount of time is set based on a desired delay time of the buffer.

6. The method according to claim 1, wherein the acceptance limit is 25% of the capacity of the buffer.

7. The method according to claim 1, wherein the incoming requests are telephone calls.

8. The method according to claim 1, wherein the incoming requests are data transmissions.

9. An apparatus for throttling incoming requests, comprising:

a server having a variable size buffer that stores incoming calls request to being processed by the server; and a controller coupled to the server that determines whether the server is overloaded, if the server is overloaded then storing the incoming requests in the buffer only if a number of incoming requests currently stored in the buffer is less than an acceptance limit, and if the server is not overloaded, then storing the incoming request in the buffer;

wherein the acceptance limit is less than 100% of a capacity of the buffer while the server is overloaded, and wherein the acceptance limit is varied in response to the overload status of the server and a desired delay time of processing incoming requests stored in the buffer.

10. The apparatus according to claim 9, wherein determining whether the server is overloaded is based on at least an incoming request rate and a processing rate of the server.

11. The apparatus according to claim 10, wherein the server is overloaded if the incoming request rate exceeds the processing rate of the server.

12. The apparatus according to claim 11, wherein the server is overloaded if the incoming request rate exceeds the processing rate of the server for a predetermined amount of time.

13. The apparatus according to claim 12, wherein the predetermined amount of time is set based on a desired delay time of the buffer.

14. The apparatus according to claim 9, wherein the acceptance limit is 25% of the capacity of the buffer.

15. The apparatus according to claim 9, wherein the incoming requests are telephone calls.

16. The apparatus according to claim 9, wherein the incoming requests are data transmissions.

* * * * *